May 24, 1966

E. R. MARSH ETAL 3,253,261

RING CONTROL CIRCUITS

Filed March 24, 1960

INVENTORS
ELLIOTT R. MARSH
GEORGE J. SAXENMEYER

BY *Sughrue, Rothwell, Mion & Zinn*
ATTORNEYS

May 24, 1966  E. R. MARSH ETAL  3,253,261
RING CONTROL CIRCUITS
Filed March 24, 1960  5 Sheets-Sheet 4

| TIMING PULSES | AP | BP | CP | DP | AP | BP | CP | DP | AP | BP | CP | DP | AP | BP | CP | DP | AP | BP | CP | DP | AP | BP | |
|---|---|---|---|---|---|---|---|---|---|---|---|---|---|---|---|---|---|---|---|---|---|---|---|
| FLD. RING | | | F1-9 | | | | F9-8 | | | | F8-7 | | | | F7-6 | | | | | | | | |
| | | | | F9 | | | | F8 | | | | F7 | | | | F6 | | | | | | | |
| FLD. STP. MATCH | | | | | | | | | | | FLD. STP. MATCH | | | | | | | | | | | | |
| FLD. CYCLE RING | | | | | | | | | | | | | FLD. RING LAST | | FLD. RING TEST | | | | | | | |
| | | | | | | | | | | | | | | FLD. RING LAST PLUS | | FLD. RING STP. | | | | | | |

PROGRAM CYCLE RING

United States Patent Office 3,253,261
Patented May 24, 1966

3,253,261
RING CONTROL CIRCUITS
Elliott R. Marsh, Endicott, and George J. Saxenmeyer, Vestal, N.Y., assignors to International Business Machines Corporation, New York, N.Y., a corporation of New York
Filed Mar. 24, 1960, Ser. No. 17,387
8 Claims. (Cl. 340—168)

This invention relates to circuits for controlling the operation of rings used in electronic digital computers and more particularly to a control circuit for stopping the operation of a ring.

In present day electronic digital computers a number of rings, or electronic commutators, are provided to control the flow of information between various parts of the computer. These rings are well known in the art and usually comprise a series of bistable devices having a set condition and a reset condition. These bistable devices are interconnected so that only one of the devices is in the set condition at a particular time. Upon the initiation of the operation of such a ring, the first bistable device is switched to a set condition. After a certain time interval the next stage is set and the first stage is reset. Similarly the set condition is switched to succeeding bistable devices. The outputs of these bistable devices provide a succession of control signals which are used to control the flow of information in the computer.

In many applications it is desirable to stop the ring when the set condition steps through a particular bistable device, or stage. For example, in the copending application entitled "Computer Programming System," inventor Elliott R. Marsh, Serial No. 17,422, filed March 24, 1960, now Patent 3,166,668, to the same assignee, there is disclosed a computer in which a FIELD RING controls the read-out of the digit positions of a register. In that computer, only particular digit positions of the register are read out. Therefore, it is desirable to start the FIELD RING at a particular stage to read-out the first desired digit and to stop the FIELD RING at a particular stage so that only particular digits are read out. In that computer the FIELD RING is started and stopped at particular stages under control of a FIELD REGISTER which stores an instruction designating those digit positions of the register which are to be read out. That is, the FIELD REGISTER has stored therein a unit position indicating the stage at which the FIELD RING is to start and a tens position indicating the stage at which the FIELD RING is to stop. When the FIELD RING steps through the stage indicated in the tens position of the FIELD REGISTER, the FIELD RING must be stopped.

However, in such a computer the FIELD RING may also be used to read information back into the register. Because of system requirements, the information is read back into the register a slightly delayed time after the read-out. In view of this, it is necessary to delay the stopping of the FIELD RING for a predetermined time after the FIELD RING steps through the stage indicated in the tens position of the FIELD REGISTER.

In other applications an additional requirement is imposed upon the control system used to stop the ring in that the predetermined time delay must be variable. For example, in the computer disclosed in the application referred to above, another ring, designated the PROGRAM RING, is provided to perform a similar function to that of the FIELD RING. The requirements for stopping this PROGRAM RING are similar to the requirements for stopping the FIELD RING with the added requirement that the predetermined delay interposed before the stopping of the PROGRAM RING must be variable. That is, when performing a first arithmetic operation, referred to as a "true and, add to accumulator" operation, the PROGRAM RING must be allowed to step through two additional stages after it has stepped through the stage which read out the last digit position of the register. In another operation, referred to as "complement add, add to accumulator" operation, the program ring must step through only one additional stage after stepping through the stage causing read-out of the last position in which a digit is stored in the register. Therefore, the delay must be variable.

Accordingly, it is an object of this invention to provide an improved system for controlling the operation of rings in electronic digital computers.

It is a further object to provide an improved system for stopping the operation of a ring at a desired time.

It is a further object to provide an improved system for stopping the operation of a ring a predetermined time after the ring has stepped through a particular stage.

It is a further object to provide an improved system for stopping the operation of a ring a predetermined time after the ring has stepped through a particular stage wherein the predetermined time may be varied in accordance with the arithmetic operation to be performed by the computer.

These and further objects and advantages of the present invention will be apparent from the following description and appended claims taken in conjunction with the figures, wherein:

Each circuit component in the figures of the drawings is numbered beginning with a digit corresponding to the number of the figure in which it appears. The components shown in block form in the figures are all well known in the art. The AND gates referred to are gating circuits which produce an output only upon the energization of all input leads. The OR circuits produce an output upon the energization of any of the input leads and latches are bistable devices having a set and a reset condition.

In accordance with one embodiment of the invention, a FIELD RING is provided having a plurality of stages, the outputs of which may be used to read information into and out of a register. A FIELD REGISTER is provided to store the portion of the instruction which controls the stage at which the FIELD RING is to be started and the stage at which the FIELD RING is to be stopped. This FIELD REGISTER has a units position indicating the stage at which the FIELD RING is to be started and a tens position indicating the last stage to read information out of the register. When the FIELD RING steps through the stage specified by the tens position of the FIELD REGISTER, a FIELD MATCH CIRCUIT produces a FIELD STOP MATCH signal. This FIELD STOP MATCH signal initiates operation of a FIELD CYCLE RING which interposes the predetermined delay between the detection of the FIELD RING stepping through the stage specified by the tens position of the FIELD REGISTER and the actual stopping of the FIELD RING. The FIELD CYCLE RING comprises a number of bistable devices arranged in the same manner as the bistable devices of the FIELD RING. When the FIELD CYCLE RING is started by the FIELD STOP MATCH signal, the read-out of digits from the register under control of the field ring is inhibited. However, the operation of the FIELD RING is not stopped immediately. Instead, the FIELD RING is stopped after the FIELD CYCLE RING has stepped through several additional stages. This delay allows the FIELD RING to produce an additional signal for controlling the read-in of information to the register.

In another embodiment of the invention a PROGRAM CYCLE RING is provided for delaying the stopping of the PROGRAM RING in a manner similar to the manner in which the stopping of the FIELD RING is delayed. In addition, means are provided for starting the operation of the PROGRAM CYCLE RING at the first stage or at a succeeding stage depending upon the amount of delay required.

Figure 6:
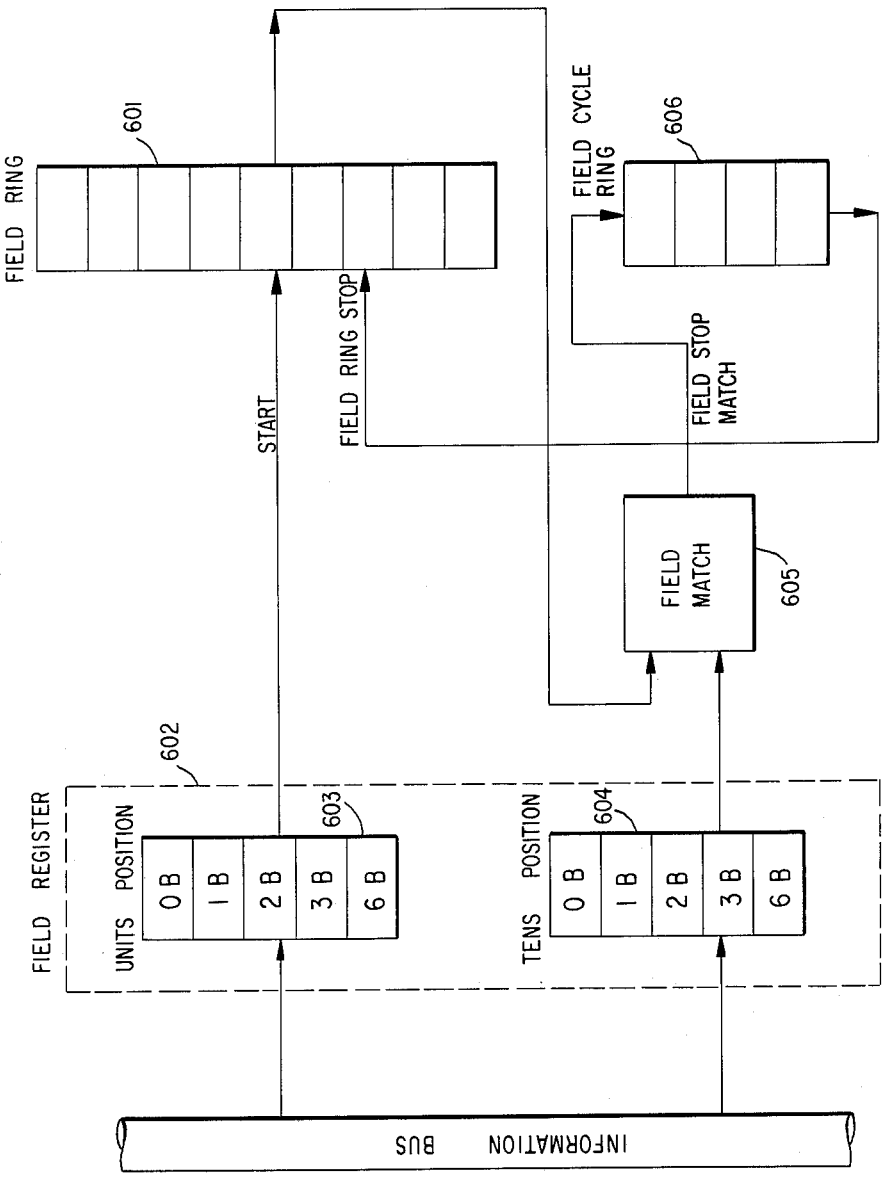
FIGURE 6 shows a block diagram of the ring control system of the present invention.

Referring now to FIGURE 6 there is shown a block diagram of applicants' ring control system. A FIELD RING 601 having a plurality of stages, the outputs of which may be used to read information into and out of a register, is provided. In order to stop and start the FIELD RING 601 at particular stages, a FIELD REGISTER 602 is provided to store the portion of the instruction which controls the stage at which the FIELD RING is to be started and the stage at which the FIELD RING is to be stopped. The FIELD REGISTER 602 has a units position 603 indicating the stage at which the FIELD RING is to be started and a tens position 604 indicating the last stage to read information out of the register. When the FIELD RING 601 steps through the stage specified by the tens position 604 of the FIELD REGISTER, a FIELD MATCH CIRCUIT 605 produces a FIELD STOP MATCH signal. The signal initiates operation of a FIELD CYCLE RING 606 which interposes the predetermined delay between the detection of the FIELD RING stepping through the states specified by the tens position of the FIELD REGISTER and the actual stopping of the FIELD RING. The FIELD CYCLE RING 606 comprises a number of bistable devices arranged in the same manner as the bistable devices of the FIELD RING. When the FIELD CYCLE RING has stepped through all of its stages it produces a FIELD RING stop signal which is connected to the FIELD RING 601 to stop the operation of that FIELD RING.

Figure 1:
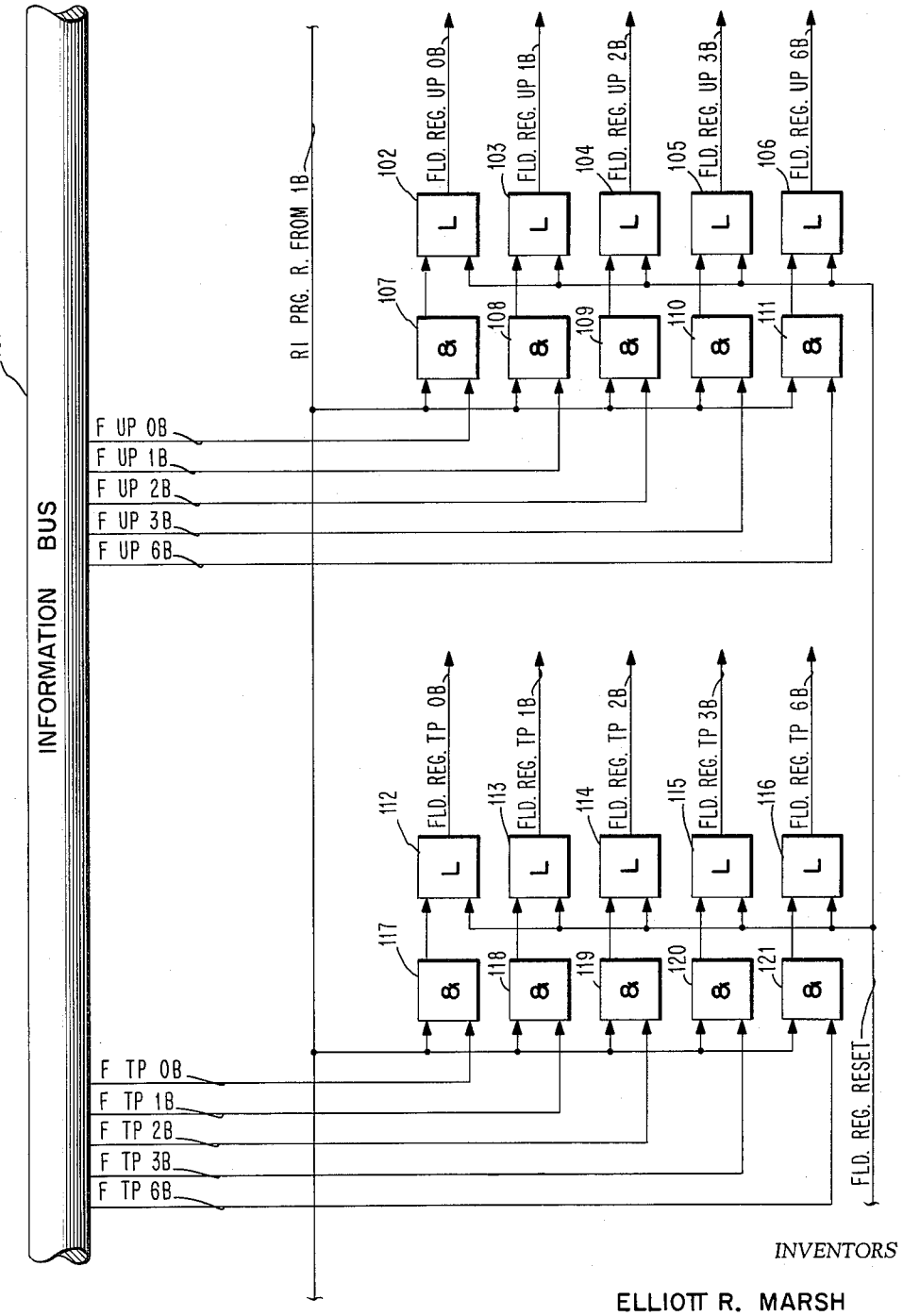
FIGURE 1 shows a block diagram of the FIELD REGISTER.

In the following description, it will be assumed that a 2 out of 5 code is used as is well known in the art. Referring to FIGURE 1, there is shown the FIELD REGISTER which is set to indicate the positions which are to be read out by the FIELD RING. The information to be inserted into the FIELD REGISTER is obtained from an INFORMATION BUS 101. The five bits of the units position, designated F UP 0B, F UP 1B, F UP 2B, F UP 3B, and F UP 6B are transferred in parallel to FIELD REGISTER LATCHES 102–106. These bits are transferred to the FIELD REGISTER LATCHES 102–106 through AND gates 107–111. These AND gates are activated by a READ - IN PROGRAM REGISTER FROM INFORMATION BUS signal (RI, PRG. RFRM IB), which is merely a gating signal for initiating the setting of the LATCHES 102–106. The setting of the LATCHES 102–106 indicates by the 2 out of 5 code which position of the FIELD REGISTER is to be started. That is, if FIELD LATCH REGISTER 102 and FIELD LATCH REGISTER 105 are set, the FIELD RING starts with position 3. Similarly, the information to be inserted into the tens position of the FIELD REGISTER is transferred in parallel from the INFORMATION BUS 101 to the FIELD REGISTER LATCHES 112–116. This parallel information, designated F TP 0B, F TP 1B, F TP 2B, F TP 3B, F TP 6B is transferred through AND gates 117–121 to the FIELD REGISTER LATCHES 112–116. The AND gates 117–121 are provided merely to gate information into the FIELD REGISTER LATCHES at the proper time and are energized by the RI PRG. R from IB signal.

Figure 2:
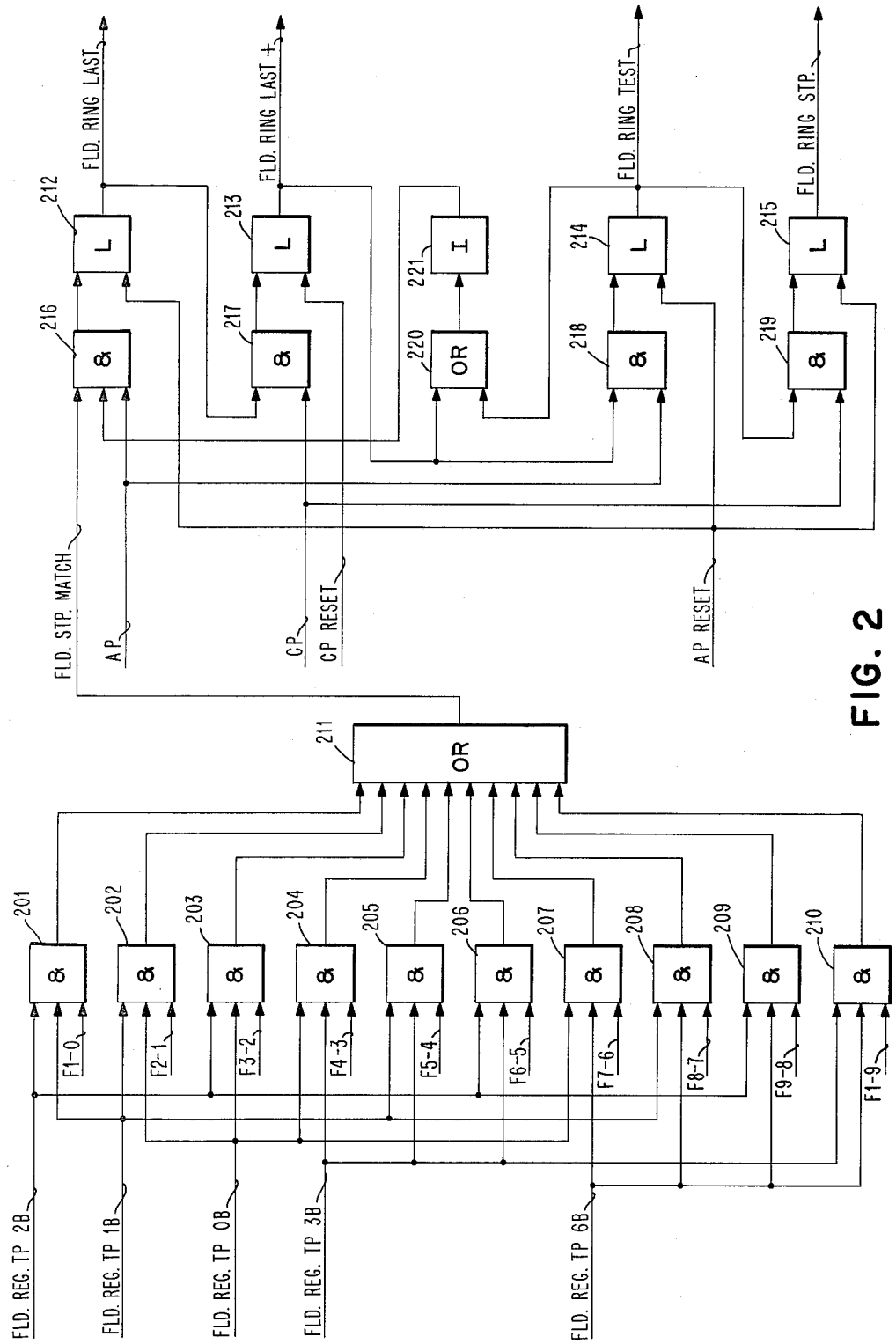
FIGURE 2 shows a block diagram of the FIELD MATCH CIRCUIT and the FIELD CYCLE RING.

FIGURE 2 shows the FIELD MATCH and FIELD CYCLE RING circuits which operate to stop the FIELD RING at a particular position specified by the tens position of the FIELD REGISTER. The signals from the positions of the FIELD RING F1–0, F2–1, F3–2, F4–3, etc., designate the half-time signals, are compared with the outputs of the FIELD REGISTER LATCHES in AND gates 201–210. When a match is obtained between the position of the FIELD RING and the position specified in the FIELD REGISTER one of the AND gates 201–210 produces an output. The outputs of the AND gates 201–210 are ORed in OR circuit 211, the output of which is designated the FIELD STOP MATCH signal.

The FIELD CYCLE RING comprises the LATCHES 212–215 and the AND gates 216–219. These latches and AND gates are connected to form a ring-type circuit as is well known in the art. The FIELD STOP MATCH signal is connected to AND gate 216 in order to start the FIELD CYCLE RING. OR circuit 220 and INVERTER 221 are connected to inhibit the FIELD CYCLE RING from being started if it is already running. The signals FIELD RING LAST, FIELD RING LAST +, FIELD RING TEST, and FIELD RING STOP, taken from the outputs of LATCHES 212 through 215 are the outputs of the FIELD CYCLE RING.

Figure 3:
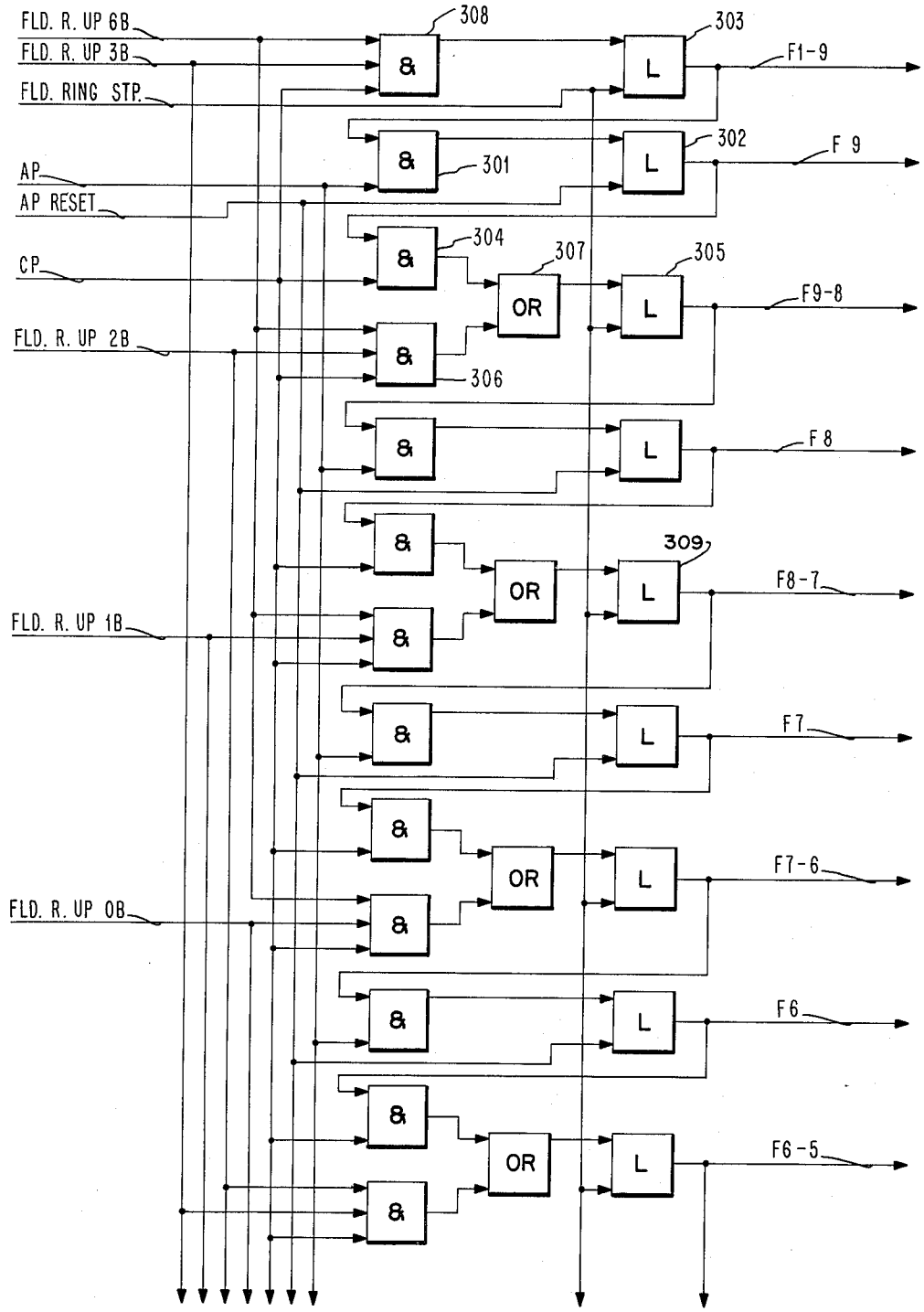
FIGURE 3 shows the FIELD RING.

FIGURE 3 shows the stages of the FIELD RING. While only nine stages have been shown, it should be appreciated that the ring may comprise many additional stages. This FIELD RING generates F signals for use in withdrawing certain digits from a register and for inserting digits back into the register. The FIELD RING will successively produce a number of F signals, designated F0, F1, F2, F3, etc., and also a number of half-time F signals between each of the F signals. The half-time signals are designated F1–0, F2–1, F3–2, F4–3, etc. Each F stage of the FIELD RING comprises an AND gate and a latch. For example, the stage producing the F9 signal comprises AND gate 301 and LATCH 302. The LATCH 302 will be switched to its set condition upon the occurrence of an A pulse (AP), which is merely a timing signal as will be subsequently explained, at the same time that the previous stage is in the set condition. For example, referring again to the stage producing the F9 signal, the LATCH 302 will be set by the AP passing through AND 301 if the latch of the previous stage, that is, LATCH 303, is set.

Each of the half-time stages, for example, the stage producing signal F9–8, comprises an AND circuit 304 and a LATCH 305 which will be set by periodic timing signals, in this case C pulses (CP), only if the previous stage is in the set condition just as was described previously. In addition, the half-time stages have an additional AND and OR gate, for example, the AND gate 306 and the OR gate 307. This additional circuitry is used to start the FIELD RING at a particular stage specified by the FIELD REGISTER. As an example, the output of the FIELD REGISTER LATCH 106 designated FLD. R. UP 6B and the output of FIELD REGISTER LATCH 104, designated as FLD. R. UP 2B, are both connected to AND gate 306 indicating that the FIELD RING is to be started with the position reading out stage 8 of the register. Accordingly, AND gate 306 is energized and this AND gate will act through OR 307 to set the LATCH 305 and start the ring at this stage.

Means are also provided for stopping the operation of the FIELD RING. The FIELD RING STOP signal, taken from LATCH 215 is applied to the reset input of all the latches in the half-time stages so that the ring will be stopped upon the occurrence of the FIELD RING STOP signal.

The operaiton of the control system for starting and stopping the FIELD RING can best be explained with reference to the timing diagram of FIGURE 4. In FIG- URE 4 the timing pulses are shown at the top of the diagram. These pulses, designated AP, BP, CP and DP are produced by any well known clock pulse generator. In explaining the operation of this system, it will be assumed that the instruction inserted into the FIELD REGISTER specifies that the FIELD RING is to be started with the F1–9 stage and that the F8–7 stage of the FIELD RING is the last to be used to read information out of the register. Accordingly, FIELD REGISTER LATCHES 105 and 106 are set from the INFORMATION BUS 101. The signals FLD. R. UP 6B and FLD. R. UP 3B activate AND gate 308 and at the next CP time the LATCH 303 is set, thus producing the signal F1–9. This signal activates AND gate 301 and at the next A pulse time latch 302 is set, thus producing the signal F9. Similarly, signals F9–8 and F8 are produced by succeeding stages. When the LATCH 309 is set, the signal F8–7 is provided. This is the last signal to be used in reading information out of the register which is connected to the FIELD RING. Accordingly, the signal F8–7 matches with the signals FLD. R. TP 6B and FLD. REG. TP 1B at AND gate 207 to produce the FIELD STOP MATCH signal. This signal passes through OR gate 211 and activates AND gate 216. At the next A pulse time the LATCH 212 is set and the FIELD CYCLE RING is started. This latch produces the FLD. RING LAST signal which in turn activates AND gate 217 so that at the next C pulse time the LATCH 213 is set. The FIELD RING LAST + signal is produced. This signal may be used to inhibit the further read-out of information from the register under the control of the FIELD RING. This may be necessary since it should be noted that the FIELD RING has been allowed to run past the F8–7 position specified by the FIELD REGISTER. The FIELD CYCLE RING subsequently produces the FLD. RING TEST signal and the FLD. RING STOP signal. The FLD. RING STOP signal is applied to the reset position of the latches in the FIELD RING and stops the operation of the FIELD RING. Thus, the FIELD CYCLE RING has delayed the stopping of the FIELD RING so that two signals, F7–6 and F6, are produced after the FIELD STOP MATCH signal. These two additional signals may be used to read information back into the register.

Figures 4, 5:
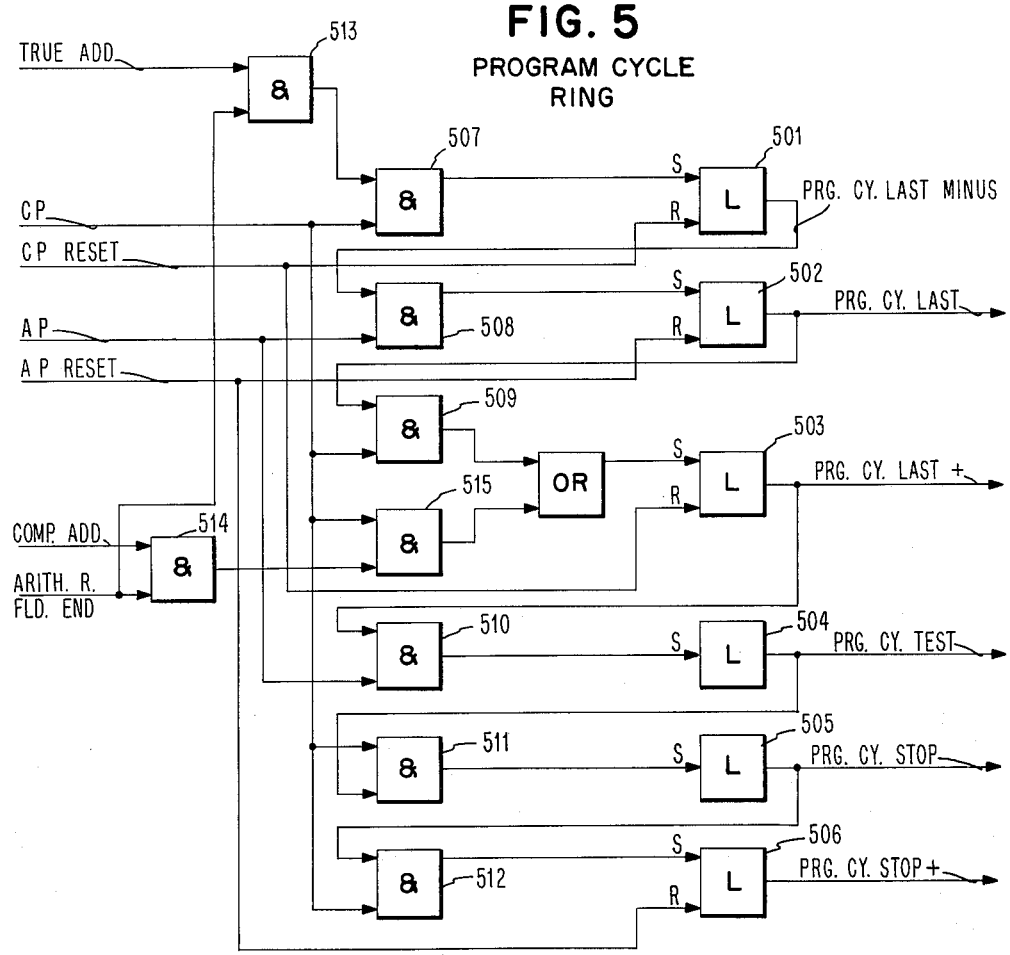
FIGURE 4 shows a timing diagram.
FIGURE 5 shows a block diagram of the PROGRAM RING.

Referring to FIGURE 5, there is shown a PROGRAM CYCLE RING illustrating another aspect of this invention. The PROGRAM CYCLE RING is an auxiliary ring which performs a function similar to that of the FIELD CYCLE RING previously described in that it interposes a delay between the stop signal and the actual stopping of the primary ring. The PROGRAM CYCLE RING comprises a number of LATCHES 501–506 and a number of AND gates 507–512 connected to form a ring circuit in the usual manner. Additional AND gates 513 and 514 are provided for starting the PROGRAM CYCLE RING either at the first stage producing the PROGRAM CYCLE LAST − signal or at the third stage producing the PROGRAM CYCLE LAST + signal. The PROGRAM CYCLE RING is selectively started at the first or the third stage under control of two signals which are designated TRUE ADD and COMPLEMENT ADD. These two signals are applied to AND gate 513 and AND gate 514, respectively. A signal ARITHMETIC REGISTER FIELD END is also applied to both AND gates 513 and 514. This signal performs a function similar to the FIELD STOP MATCH signal previously described in that it initiates the operation of the auxiliary ring which ultimately stops the primary ring. Thus, if the lead bearing the signal TRUE ADD is energized, upon the occurrence of the signal ARITH R. FLD. END. the AND gate 513 is energized and this in turn energizes AND gate 507 which will pass the next C pulse to set LATCH 501. Operation of the PROGRAM CYCLE RING is initiated and the main ring will be stopped upon the occurrence of the PROGRAM CYCLE STOP signal taken from the LATCH 505. In this mode of operation there is a delay comprising the time to step through five stages of the PROGRAM CYCLE RING between the ARITHMETIC REGISTER FIELD END signal and the PROGRAM CYCLE STOP signal.

On the other hand, if the line bearing the signal COMPLEMENT ADD is energized, the AND gate 514 is activated by the ARITHMETIC REGISTER FIELD END signal. The AND gate 514 will activate AND gate 515 and allow it to pass the next C pulse to set the LATCH 503. The operation of the PROGRAM CYCLE RING begins with this latch and the PROGRAM CYCLE RING steps through the remainder of the stages. In this mode of operation there is a delay comprising the time required to step through three stages of the PROGRAM CYCLE RING between the ARITHMETIC REGISTER FIELD END signal and the PROGRAM CYCLE STOP signal.

What has been described is a system for stopping the operation of a primary ring under control of an auxiliary ring which interposes a delay between the stop signal and the actual stopping of the ring.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A control system for stopping the operation of a primary ring circuit in response to a stop signal comprising: a primary ring, means connected to said primary ring to start operation thereof, means to generate a stop signal, means receiving said stop signal and a selected output signal from said ring to produce an output signal when a match exists between said stop signal and said ring output signal, a delay circuit having an input connected to said last means and an output, said delay circuit producing at its output a delayed stop signal a predetermined time after said input is energized and means in said delay circuit connecting said delayed stop signal to said primary ring for stopping the operation thereof.

2. The control system recited in claim 1 wherein the delay circuit is an auxiliary ring.

3. A control system for stopping the operation of a primary ring circuit a predetermined time after the ring circuit steps through a predetermined stage comprising a primary ring, means connected to said primary ring to start the operation thereof, means to generate a stop signal identifying said predetermined stage, means to match said stop signal with successive output signals from said ring stages to generate an output signal therefrom upon the occurrence of an output signal from said predetermined stage, a delay circuit having an input connected to the output of said last named means and an output, said delay circuit producing at its output a delayed stop signal a predetermined time after said input signal is energized and means in said delay circuit connecting said delayed stop signal to said primary ring for stopping the operation thereof.

4. The control system recited in claim 3 wherein the delay circuit is an auxiliary ring.

5. The control system recited in claim 3 wherein the means for determining the time at which the primary ring steps through the predetermined stage comprises a register, said register containing information indicative of the predetermined stage, a comparator, said register being connected to said comparator, the stages of said primary ring being connected to said comparator, said comparator producing an output when said primary ring steps through the predetermined stage, the output of said comparator being connected to said delay circuit.

6. The control system recited in claim 5 wherein the delay circuit is an auxiliary ring.

7. The control system recited in claim 5 wherein said delay circuit produces a variable delay.

8. The control system recited in claim 6 wherein the means for initiating the operation of said auxiliary ring includes means for selectively initiating the operation of said auxiliary ring at the first stage or at a succeeding stage whereby the delay between the occurrence of said stop signal and the stopping of said primary ring is variable.

References Cited by the Examiner

UNITED STATES PATENTS

| | | | |
|---|---|---|---|
| 2,427,533 | 12/1947 | Overbeck | 328—43 X |
| 2,536,917 | 1/1951 | Dickinson | 340—168 |
| 2,594,731 | 4/1952 | Connolly. | |
| 2,935,255 | 5/1960 | Reiner | 328—43 X |
| 3,035,248 | 5/1962 | Grose et al. | 340—163 |

NEIL C. READ, *Primary Examiner.*

E. R. REYNOLDS, *Examiner.*

PETER XIARHOS, *Assistant Examiner.*